April 29, 1952     A. MÁNDI ET AL     2,594,952
TWO-POLE TURBOGENERATOR ROTOR
Filed Feb. 18, 1948
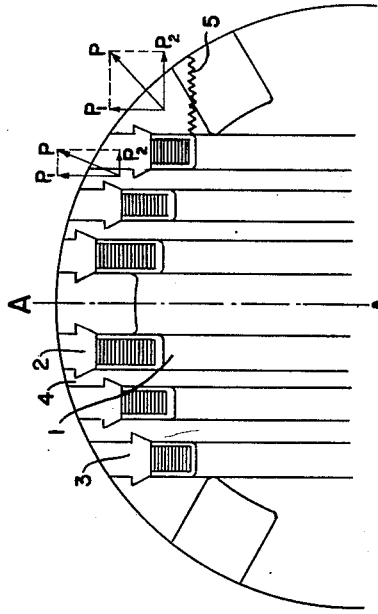
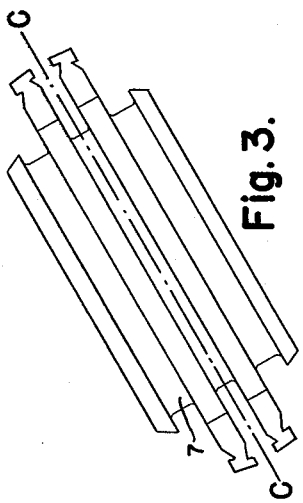
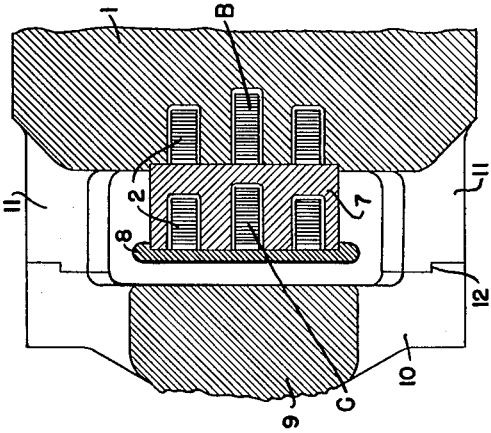
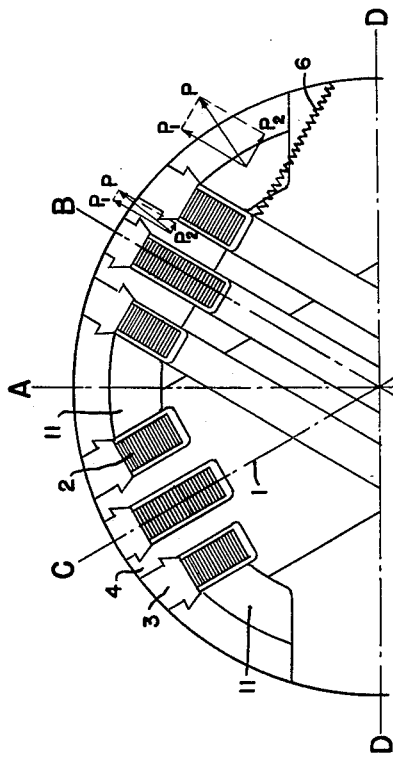
Inventors
ANDREW MANDI
FRANCIS RATKOVSZKY
By   *Mock + Blum*
Attorneys Patented Apr. 29, 1952

2,594,952

UNITED STATES PATENT OFFICE 2,594,952

TWO-POLE TURBOGENERATOR ROTOR

Andrew Mándi and Francis Ratkovszky,
Budapest, Hungary

Application February 18, 1948, Serial No. 9,306
In Hungary December 27, 1941

Section 1, Public Law 690, August 8, 1946
Patent expires December 27, 1961

11 Claims. (Cl. 171—206)

In the rotors of two-pole turbo-generators the grooves for accommodating the winding are usually arranged either by radially, or in consecutive parallel planes.

The advantage of parallel grooves consists in that the grooves are continued also on the end surfaces of the rotor body, that is to say, axial and end grooves are relatively arranged and formed to present grooved formations in which companion axial and end grooves extend on a common plane extending normal to the coil axis to form a groove of oblong form for coil reception, so that the winding is embedded in iron along its whole length, and, accordingly, there are no end turns proper projecting from the rotor body. The grooves of at least one system are milled out from the rotor body perpendicular to the coil axis, and each coil is located in one plane of its own, all that has to be done being to bend the copper bands (or bands of other metal) constituting the coil flatly, and, after having them prestressed in the necessary extent, to press them down in the grooves by means of wedges on their longitudinal surfaces. As against this, in the radial system of grooves the winding has to be coiled on edge, without any possibility of making it prestressed, and the coil heads projecting from the rotor body have to be fastened, against the centrifugal forces of substantial magnitude set up therein, by means of complicated devices constituting possible sources of defects.

On the other hand, the system of parallel grooves known up to now is saddled with the drawback that whilst, in the radial system of grooves, it is tensile stresses only which are set up by the centrifugal forces in the teeth holding the winding, in the case of parallel grooves the teeth are subjected to bending stresses also, which latter will be all the greater the greater the distance between the particular teeth and the plane of symmetry of the groove system. Fig. 1 represents the cross-section of a rotor embodying the system of parallel grooves known up to now, on which 1 denotes the rotor body, 2 the winding, 3 the wedges and 4 the teeth. The centrifugal forces P acting on the teeth, resulting as the sums of the centrifugal forces of the winding, of the wedges and of the teeth, can be resolved on each tooth into two components, of which $P_1$ subjects the tooth to a tensile strain, and $P_2$ to a bending strain. The highest bending strain will, as a rule, be set up in the cross-section 5 of the nose-shaped tooth supporting the outermost groove. In order to prevent this strain exceeding the limit considered permissible in view of the strength of the material of the rotor, it is necesssary to substantially limit the depth of the grooves, particularly that of the outermost groove. For the same reason, it is impossible to arrange the grooves considerably distant from the plane of symmetry A—A, as this would cause the component $P_2$ to become excessively increased, whilst the area of the cross-section 5 would more and more decrease; this circumstance will, accordingly, at the same time also limit the width of the grooves. In the case of the radial system of grooves no similar limitations exist, and therefore the total cross-sectional area of the grooves attainable with this system, as well as the coil quantity held therein is substantially greater than in the case of the system of parallel grooves, the greater coil quantity also resulting in more rotor ampere-turns and thus in a greater output capacity of the generator. Accordingly, with identical dimensions of the rotor body and with identical strains of material, the system of radial grooves enables higher output capacity to be achieved than that achieved by means of the system of parallel grooves as known up to now.

The details of an exemplifying embodiment of the invention are shown on Figs. 2 to 4, Fig. 2 showing the cross-section of the winding, Fig. 3 the plan view of a preferable accessory of the frontal face of the rotor, and Fig. 4, in an axial section of the rotor, the arrangement of the end turns of the coils.

This arrangement, whilst maintaining all the constructional advantages mentioned above of the system of parallel grooves, enables the mechanical stresses to be substantially reduced, and thus either permits the employment of materials of lower mechanical strength which are, accordingly, less expensive and easier to obtain, or, if the mechanical stresses to which the material is subjected are maintained, it permits coils of substantially greater dimensions to be accommodated on the rotor, thereby enabling the output capacity of the generator to be substantially increased.

The substance of the solution of the problem consists in that instead of one, two parallel systems of grooves and, consequently, two parallel coil systems are arranged on the rotor so as to have coil symmetry planes crossing each other under a certain angle on the frontal faces. Fig. 2 shows the planes of symmetry B—B and C—C, respectively, of the two coil systems. The symbols denoting the rotor body, the winding, the wedges and the teeth are the same as used on Fig. 1. The average width of each system amounts on Fig. 2 to one-half of that in the case of the earlier arrangement shown on Fig. 1, and thus the distance of the outermost grooves from the corresponding plane of symmetry results also at a substantially smaller figure. This fact will also considerably reduce the component $P_2$ by which the teeth are subjected to a bending strain, and will cause the stress set up in the nose 6 to become lessened to a fraction of the stress set up in the nose 5 of the arrangement according to Fig. 1, seeing that, besides the bending force being smaller, the width dimension of the cross-sectional area 6 will also be much greater than that of the cross-sectional area 5.

Consequently, the mechanical stresses will become substantially reduced and will therefore enable to employ a material of lower mechanical strength, or, in case of the employment of a given quality of material, will permit the construction of rotors of a size which, owing to the high stresses set up by centrifugal forces, would be impracticable with the known single groove system. If, on the other hand, the strains would be acceptable with the earlier construction also, the fact of the new construction being more preferable may be utilized in that there are permissible thinner and longer teeth, and, accordingly, wider and deeper grooves, in which coils of substantially greater dimensions may be accommodated, thereby enabling the output capacity of the generator to be greatly increased.

The end groove portions of the two parallel systems of grooves are mutually crossing on the frontal faces, wherefore the end turns of the coils have to pass here over each other in two layers. This can be done either by milling, into each of the frontal surfaces of the rotor, a groove system of greater depth for accommodating the lower end turns B—B, and a second groove system of smaller depth for accommodating the end turns C—C situated above, or, preferably, by milling into the frontal surfaces of the rotor the grooves for accommodating the lower end turns only, whilst the upper end turns are placed into the grooves of special holders which are fixed on the frontal surfaces only after the turns situated below the frontal surfaces have already been coiled in. These holders in such cases forming parts of the rotor and may be provided also with special covers for safeguarding them against any possibility of their bending aside under the centrifugal force.

It appears from Fig. 4 representing the axial section along D—D of Fig. 2, that it is only the grooves for accommodating the winding belonging to the plane of symmetry B—B that are milled into the frontal surfaces of the rotor body. After these grooves have been coiled in, the holders 7, shown separately also on Fig. 3, are fixed on the frontal surfaces in such a manner as to cause their grooves to come to be placed in parallel with the symmetry plane C—C, after which the coils belonging to this plane of symmetry are coiled in. Following this, the outermost teeth of the holder 7 are additionally secured against any possibility of their bending aside by the clamping cover 8 which, in order to reduce magnetic dispersion, should preferably be made of a non-magnetic material. The arms 10 of the shaft end 9 shown on Fig. 4 are fixed on the extension pieces 11 projecting from the rotor. These extension pieces as well as the teeth are also suitable for being provided with longitudinal ventilating channels by means of which the rotor body, or the coils direct, are brought into intimate contact with cooling air. In order to secure the extension pieces 11 against any bending-out caused by centrifugal forces, gradations 12 may be provided at their ends, at which gradations the said extension pieces 11 are clamped by means of correspondingly graduated fitting parts of the arms 10 of the shaft end 9; for this purpose it is, however, also possible to provide a strong clamping disc, preferably made of a non-magnetic material, between the parts 10 and 11. Of course, the arms 10 of the shaft end may also be replaced by a disc equipped, for the purpose of holding the extension pieces 11 together, with clamping parts fitting into the gradations 12 of the said extension pieces, suitable apertures for permitting the passage of cooling air being also provided on this disc.

Though the two coil systems mutually crossing on the frontal surfaces will increase the total length of the rotor, this extra length will, however, not result in any necessity of increasing the length of the whole generator, as the overhang, beyond the rotor body, of the coil heads of the stator will always be sufficiently great for ensuring that the rotor of increased length should easily find room within the longitudinal dimension defined in this manner by the whole stator.

We claim:

1. A two-pole rotor for turbo-generators, having two field coil systems of mutually crossing symmetry planes and grooves assembled for accommodating coils to groove formations of oblong type, the grooves for at least one system being milled out from the rotor body sides and ends perpendicularly to the appertaining coil axis for the respective coil systems in consecutive parallel planes, the end turns of the individual coil systems being situated at the rotor ends in two layers above each other in proper end groove portions of the respective groove oblongs.

2. A two-pole rotor for turbo-generators, having two field coil systems of mutually crossing symmetry planes and grooves assembled for accommodating coils to groove formations of oblong type, the grooves for at least one system being milled out from the rotor body sides and ends perpendicularly to the appertaining coil axis for the respective coil systems in consecutive parallel planes, the end turns being, according to the individual coil systems, situated at the rotor ends upon each other in end groove portions of correspondingly different depth at the rotor ends.

3. A two-pole rotor for turbo-generators, having two field coil systems of mutually crossing symmetry planes, grooves for accommodating the coils milled out from and arranged on the rotor body for each of the coil systems in consecutive parallel planes, and separate grooved holders on the rotor ends for the end turns of the one coil system, the end turns of the other coil system being situated below the said holders, in end groove portions of the rotor.

4. A two-pole rotor for turbo-generators, having two field coil systems of mutually crossing symmetry planes, grooves for accommodating the coils milled out from and arranged on the rotor body for each of the coil systems in consecutive parallel planes, separate grooved holders on the rotor ends for the end turns of the one coil system, and clamping covers above the grooves of the said holders engaging with outer groove teeth thereof, the end turns of the other coil system being situated below the said holders, in end groove portions of the rotor.

5. A two-pole rotor for turbo-generators having two field coil systems of mutually crossing symmetry planes, grooves for accommodating the coils milled out from and arranged on the rotor body for each of the coil systems in consecutive parallel planes, separate grooved holders on the rotor ends for the end turns of the one coil system, and non-magnetic clamping covers above the grooves of the said holders engaging with outer groove teeth thereof, the end turns of the other coil system being situated below the said holders, in end groove portions of the rotor.

6. A two-pole rotor for turbo-generators having two field coil systems of mutually crossing symmetry planes, grooves assembled for accommodating the coils to grooved formations of oblong type milled out from the rotor body sides and ends perpendicularly to the appertaining coil axis for the respective coil systems in consecutive parallel planes, and separate grooved holders on the rotor ends for the end turns of the one coil system, the end turns of the other coil system being situated below the said holders, in end groove portions of the rotor ends.

7. A two-pole rotor for turbo-generators, having two field coil systems of mutually crossing symmetry planes, grooves assembled for accommodating the coils to grooved formations of oblong type milled out from the rotor body sides and ends perpendicularly to the appertaining coil axis for the respective coil systems in consecutive parallel planes, separate grooved holders on the rotor ends for the end turns of the one coil system, and clamping covers above the grooves of the said holders engaging with outer groove teeth thereof, the end turns of the other coil system being situated below the said holders, in end groove portions of the rotor ends.

8. A two-pole rotor for turbo-generators, having two field coil systems of mutually crossing symmetry planes, grooves assembled for accommodating the coils to grooved formations of oblong type milled out from the rotor body sides and ends perpendicularly to the appertaining coil axis for the respective coil systems in consecutive parallel planes, separate grooved holders on the rotor ends for the end turns of the one coil system, and non-magnetic clamping covers above the grooves of the said holders engaging with outer groove teeth thereof, the end turns of the other coil system being situated below the said holders, in end groove portions of the rotor ends.

9. A two-pole rotor for turbo-generators, having two field coil systems of mutually crossing symmetry planes, the coils of a system being mounted on the rotor body in consecutive parallel planes, the planes of the coils of one system extending in a direction angular to the direction of extension of the coil planes of the other coil system and with the coil planes of the respective systems symmetrical to the plane of symmetry of the rotor and intersecting a plane extending through the rotor axis perpendicularly to such symmetry plane of the rotor, and grooves for accommodating the respective coils of the two systems individually with each groove including both the axial and the end turn zones of the coil, the end turn zones of the individual coil systems being situated respectively in two layers above each other with the end turns of an individual system situated in the same layer.

10. A rotor as in claim 9 characterized in that the end-turn groove zones for the coils of one of the systems is milled out of the rotor body, separate grooved holders being provided for accommodating the end-turns of the coils of the other system, said holders being situated in overlying and spaced relation to the milled end-turn grooves of the first system at the rotor ends and with the holder grooves extending in directions conforming to the coil planes of the second system to thereby preserve the angular relation of the coil planes of the respective systems to the plane of symmetry of the rotor.

11. A rotor as in claim 10 characterized in that the assembly includes a non-magnetic clamping cover for each holder, the cover being situated above and overlying the grooves of its holder with the cover engaging the outer groove teeth of the holder.

ANDREW MÁNDI.
FRANCIS RATKOVSZKY.

REFERENCES CITED

The following references are of record in the file of this patent:

UNITED STATES PATENTS

| Number | Name | Date |
|---|---|---|
| 894,144 | Hissink | July 21, 1908 |
| 1,566,939 | Welch | Dec. 22, 1925 |

OTHER REFERENCES

Hawkin's Electrical Guide Number 4, 1917, published by Theo Audel & Company, 72 Fifth Avenue, New York, page 1236.